W. G. MILLER, DEC'D.
M. MILLER, ADMINISTRATRIX.
DEVICE FOR AERATING AND MATURING FLOUR.
APPLICATION FILED AUG. 25, 1919.
1,376,110.
Patented Apr. 26, 1921.
2 SHEETS—SHEET 2.
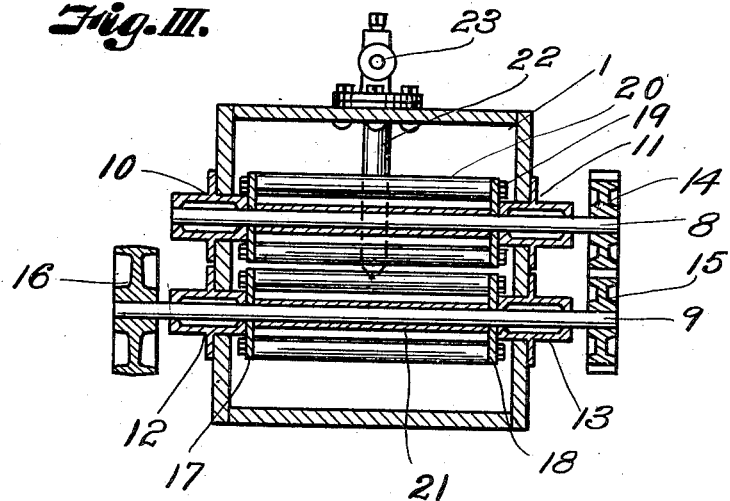
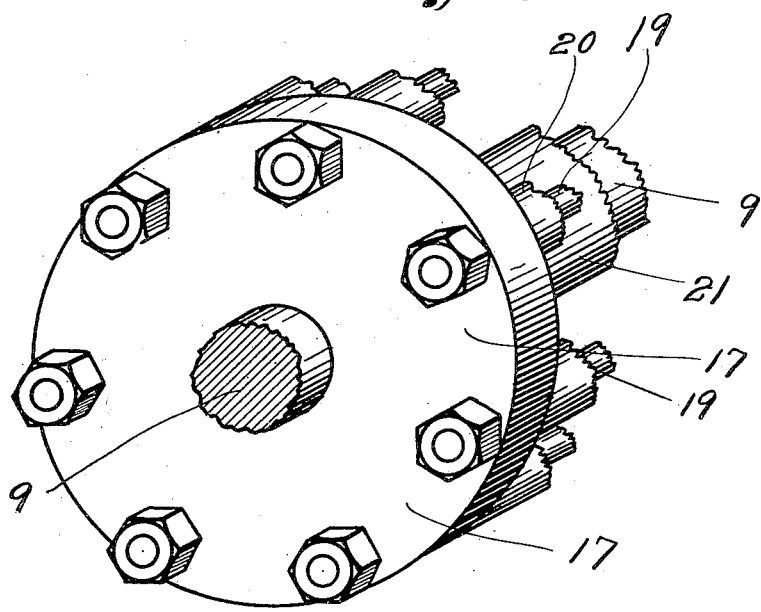
INVENTOR
William G. Miller, Dec'd.
Minnie Miller Administratrix.
BY
Arthur C. Brown,
ATTORNEY

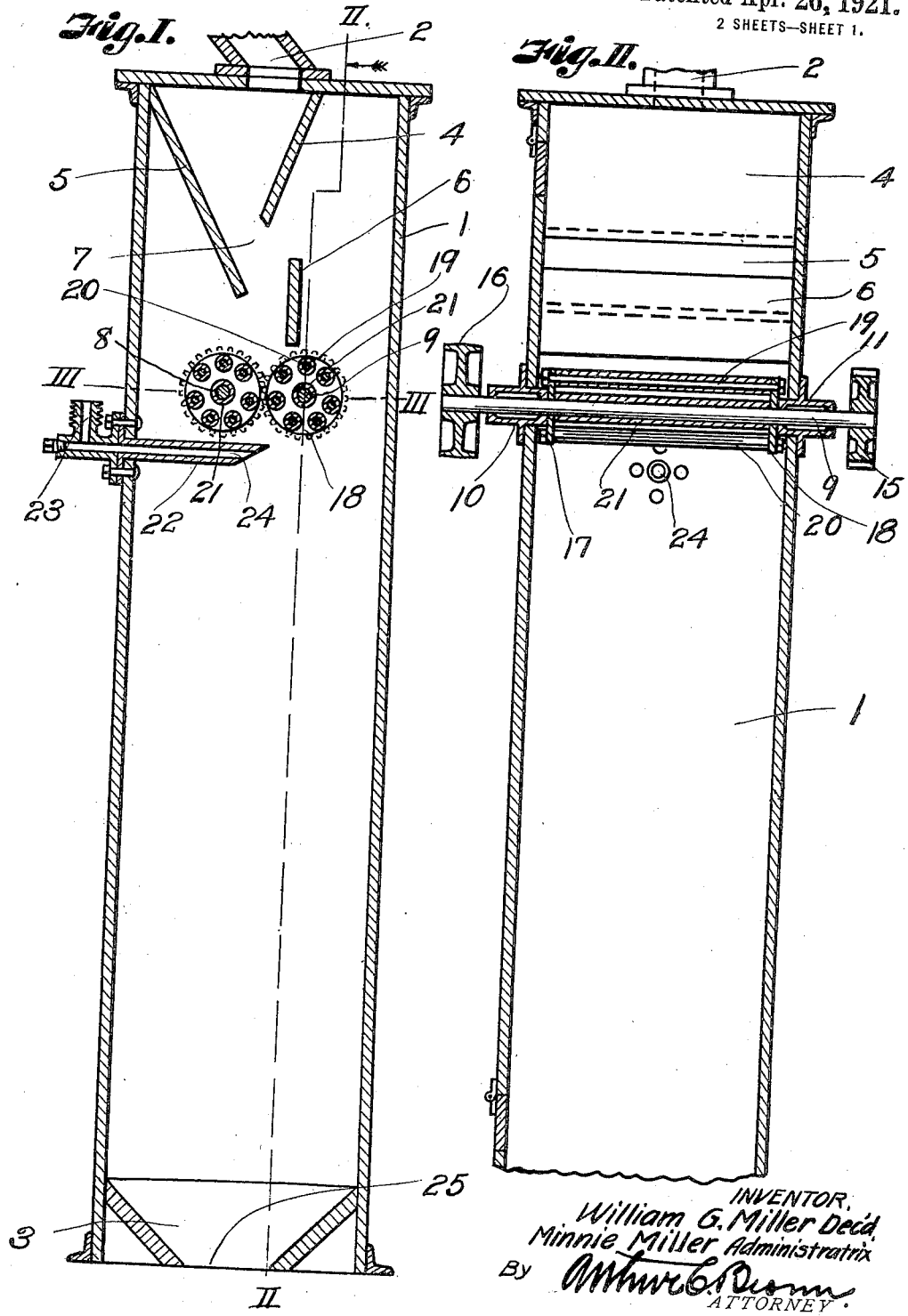

UNITED STATES PATENT OFFICE.

WILLIAM G. MILLER, DECEASED, BY MINNIE MILLER, ADMINISTRATRIX, OF KANSAS CITY, MISSOURI, ASSIGNOR TO CLARENCE M. HARDENBERGH, HENRY VILM, PAUL PANDEMALVY, AND MINNIE MILLER, ALL OF KANSAS CITY, MISSOURI.

DEVICE FOR AERATING AND MATURING FLOUR.

1,376,110.

Specification of Letters Patent. Patented Apr. 26, 1921.

Application filed August 25, 1919. Serial No. 319,741.

*To all whom it may concern:*

Be it known that I, MINNIE MILLER, administratrix, a citizen of the United States, residing at Kansas City, in the county of Jackson and State of Missouri, declare that WILLIAM J. MILLER, deceased, has invented certain new and useful Improvements in Devices for Aerating and Maturing Flour; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a device for aerating and maturing flour.

It is well known that flour is materially improved upon being aerated, and that if brought into the presence of suitable gases it may be simultaneously aerated and bleached.

According to one embodiment of my invention the flour may be fed from a suitable source of supply through an aerating chamber in which there are revolving squirrel cage rolls to break the flour into a number of streams to permit efficient aeration, and adjacent to the rolls I prefer to introduce a gas injecting nozzle, by means of which a maturing and bleaching gas, such as chlorin or nascent ozone, may be introduced to affect the flour as it passes through the aerating chamber.

In the drawings:—

Figure I is a vertical longitudinal sectional view from a device constructed in accordance with my invention.

Fig. II is a sectional view on the line II—II of Fig. I.

Fig. III is a sectional view on the line III—III of Fig. I, and

Fig. IV is an enlarged fragmentary view of one of the stream breaking rolls.

Referring now to the drawings by numerals of reference—

1 designates a substantially elongated aerating chamber having an inlet 2 at its upper end and a hopper like discharge 3 at its opposite end. Adjacent the inlet 2 of the chamber 1 are staggered baffles 4, 5, and 6, the latter being opposite a discharge opening 7, formed by the baffles 4 and 5, so that material discharging through the opening 7 will be guided between the aerating or stream dividing rolls substantially in line with the opening 7. The rolls are supported upon transverse shafts 8 and 9 in the bearings 10, 11, 12 and 13 in the side of the aerating chamber 1, and the shafts 8 and 9 are provided with gears 14 and 15 which mesh one with the other. One of the shafts, for example, the shaft 9, is provided with a pulley 16 whereby the shaft may be driven from some suitable source of power and through the gears 14 and 15 communicate power to both rolls. Each roll consists of end heads or disks 17 and 18 mounted upon a shaft 8 or 9 and connected together by rods 19 carrying sleeves 20, the ends of which butt against the heads 17 and 18. The shafts 8 and 9 are also provided with sleeves 21, the heads and sleeves being preferably constructed of a gas resisting material so as to avoid deterioration thereof when the gas enters the aerating chamber. The form of the rolls are preferably of the squirrel cage type so that the stream discharging from the opening 7 will be broken up into a plurality of sub-streams so that the finely divided particles may be thoroughly aerated, and, if desired, affected by a maturing and bleaching agent, such as chlorin or nascent ozone, which may be introduced through the injecting nozzle 22, which is provided with an inlet 23 exterior of the chamber and a discharge opening 24 preferably immediately beneath the rolls.

In actual practice the flour may be fed through the opening 2 from any suitable source and guided by the baffles 4 and 5 through the opening 7 into contact with the rotating rolls, the contact being assured by the baffle 6 against which the flour may contact as it discharges from opening 7, and a continuous rotation of the rolls will cause the flour to be broken up into a plurality of sub-streams on account of the squirrel cage formation of the rolls, so the particles will be thoroughly aerated and so the particles may be affected by the gas through nozzle 22. As the flour thus treated passes to the bottom of the aerating chamber 1 it may pass through the opening 25 in the hopper bottom 3 to a suitable receiver.

From the foregoing it will be apparent that the device permits of a continuous, efficient operation, by means of which the material, as it passes into the chamber 1, will be noticeably improved both in appearance and quality.

Having thus described my invention, what I claim as new therein and desire to secure by Letters-Patent is:—

1. In a device of the class described, a vertical, elongated chamber, flour-stream subdividing rolls in said chamber, each roll comprising heads of gas-resisting material, spaced rods connecting them in the form of a squirrel cage, gas-resisting material covering said rods, and a gas injector adjacent to the rolls.

2. A flour stream subdividing roll comprising disk-shaped heads of rubber, spaced rods arranged equi-distantly about the axes of the head and connecting said heads, and rubber spacing sleeves on the rods between the heads.

In testimony whereof I affix my signature.

MINNIE MILLER,
*Administratrix for William G. Miller, deceased.*